United States Patent
Smith

(10) Patent No.: US 7,956,725 B2
(45) Date of Patent: Jun. 7, 2011

(54) RFID TAG WITH ACCELEROMETER

(75) Inventor: Joshua R. Smith, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 11/715,038

(22) Filed: Mar. 7, 2007

(65) Prior Publication Data

US 2007/0182578 A1   Aug. 9, 2007

Related U.S. Application Data

(63) Continuation-in-part of application No. 11/145,368, filed on Jun. 3, 2005, now Pat. No. 7,336,184.

(60) Provisional application No. 60/612,881, filed on Sep. 24, 2004.

(51) Int. Cl.
*H04Q 5/22*      (2006.01)
*G08B 21/00*   (2006.01)

(52) U.S. Cl. ............... 340/10.1; 340/669; 340/686.1; 340/689; 340/539.26

(58) Field of Classification Search .............. 340/669, 340/671, 10.1
See application file for complete search history.

(56) References Cited

U.S. PATENT DOCUMENTS

| | | | | |
|---|---|---|---|---|
| 5,764,138 A | * | 6/1998 | Lowe | 340/447 |
| 5,978,972 A | * | 11/1999 | Stewart et al. | 2/422 |
| 6,087,950 A | * | 7/2000 | Capan | 340/665 |
| 6,261,247 B1 | * | 7/2001 | Ishikawa et al. | 600/587 |
| 6,496,102 B1 | * | 12/2002 | Kyrtsos | 340/10.1 |
| 6,611,783 B2 | * | 8/2003 | Kelly et al. | 702/150 |
| 6,617,963 B1 | * | 9/2003 | Watters et al. | 340/10.41 |
| 7,098,794 B2 | * | 8/2006 | Lindsay et al. | 340/572.3 |
| 2001/0033280 A1 | * | 10/2001 | Abe et al. | 345/419 |
| 2002/0140574 A1 | * | 10/2002 | Starkey et al. | 340/870.16 |
| 2004/0010390 A1 | * | 1/2004 | Kelly et al. | 702/150 |
| 2005/0080566 A1 | * | 4/2005 | Vock et al. | 702/2 |

\* cited by examiner

*Primary Examiner* — Benjamin C Lee
*Assistant Examiner* — Cal Eustaquio
(74) *Attorney, Agent, or Firm* — Trop, Pruner & Hu, P.C.

(57) ABSTRACT

One or more accelerometers may be coupled to a radio frequency identification (RFID) tag, so that the response of the RFID tag indicates the acceleration being sensed by the accelerometer(s). In some embodiments the accelerometers may be powered from the RF energy harvested by the RFID tag from a received RF signal. The sensed acceleration indicated in the response may be used to determine a motion and/or an orientation of an object coupled to the accelerometers.

6 Claims, 13 Drawing Sheets

RFID TAG WITH ACCELEROMETER

RELATED DOCUMENTS

This application is a Continuation-In-Part (CIP) of patent application Ser. No. 11/145,368, filed Jun. 3, 2005, now U.S. Pat. No. 7,336,184 which is in turn derived from provisional application 60/612,881, filed Sep. 24, 2004. This application claims priority to those dates for all applicable subject matter.

BACKGROUND

Radio frequency identification (RFID) technology is increasingly used to identify nearby devices electronically without requiring line-of-sight access or human intervention. A key advantage of this technology is that many RFID tags (e.g. passive RFID tags) can operate solely from the energy of an incoming signal and therefore don't require a battery for power. However, conventional passive RFID tags are somewhat limited in capability. Among other shortcomings, the orientation and/or movement of an RFID tag is not usually detectable by the associated RFID reader. This limits the applications in which RFID technology is deemed useful.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
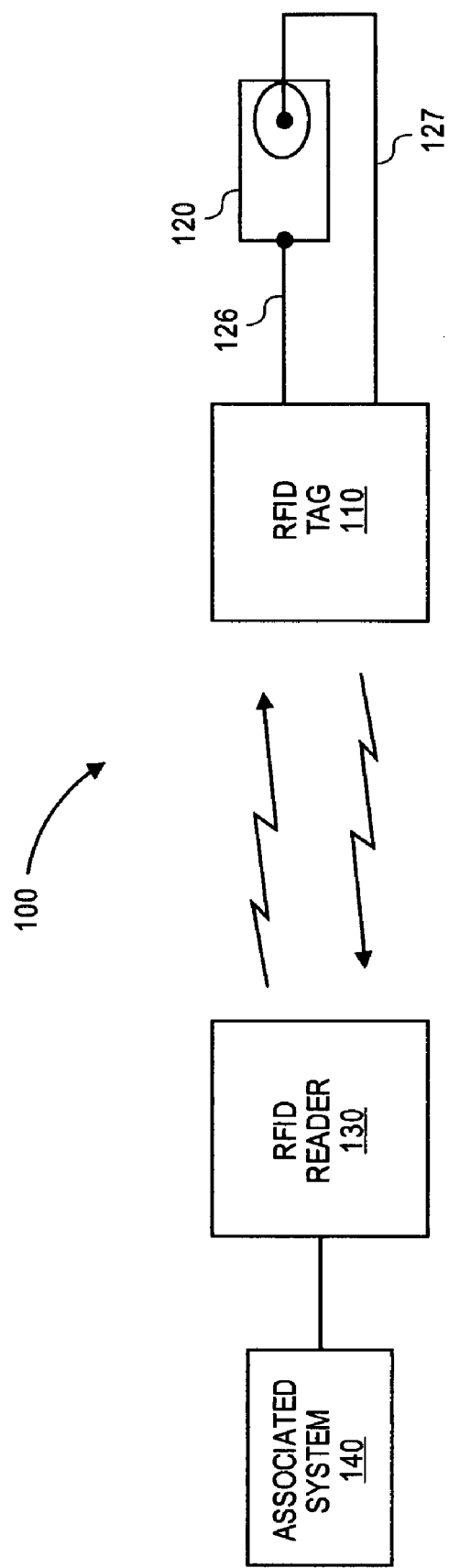
FIG. 1 shows an RFID system using an inertially controlled switch, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions stored on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; etc. A machine-readable medium may also include a tangible medium through which the instructions pass in the form of electrical, optical, acoustical or other form of propagated signals (e.g., antennas, fiber optics conductors, the circuitry of input-output interfaces, etc.)

In the context of this document, an RFID tag may be comprised of 1) an RFID antenna (to transmit/receive from/to the RFID tag), and 2) an RFID tag circuit comprising an identification (ID) circuit to hold the tag's ID number, and a modulation circuit to deliver that ID number to the antenna in a useful form. Also, 'passive' RFID tags (non-battery powered RFID tags) may comprise a power circuit to accumulate incoming energy from radio frequency signals received through the antenna and use that energy to power the RFID tag circuit. When used in conjunction with an RFID tag, the term 'transmit' may include reflecting from the antenna a modulated version of the incoming signal. An RFID reader may poll the RFID tag by transmitting the signal that energizes the RFID tag, and may receive the response transmitted by the RFID tag. Depending on the RFID technology being used, a poll may be a signal that can be picked up by any properly configured RFID tag within range, or it may include an addressed signal that is responded to only by the addressed RFID tag(s).

In some embodiments of the invention, the data transmitted by an RFID tag may represent the value(s) sensed by one or accelerometers. In some embodiments the accelerometer uses energy harvested by the RFID tag from a received radio frequency (RF) signal as its only source of operating power. Such arrangements are described in more detail in the section entitled 'Multi-Bit Accelerometers'.

FIG. 1 shows an RFID system using an inertially controlled switch, according to an embodiment of the invention. In the illustrated system 100, an RFID reader 130 may poll an RFID tag 110 by transmitting an appropriate signal to the RFID tag 110. In some embodiments the RFID tag may respond by transmitting a response that includes an identification code for the RFID tag. The contents of the response may also include one or more bits indicating the status of ICS 120, which may be connected to the RFID tag 110 by electrical conductors 126 and 127. The RFID reader 130, and/or an associated system 140, may perform various operations, depending on the contents of the received response. The RFID tag and ICS are generally referred to herein as separate items, but may also be packaged as an integrated unit. The associated system 140 may be coupled to the RFID reader directly or indirectly, locally or remotely, wired or wirelessly, or may be combined with the RFID reader into a single integrated unit.

An ICS may be an electrical switch whose state (electrically open or electrically closed) is dependent on the inertial force sensed along a particular axis of the ICS. Inertial force, as used herein, is not synonymous with momentum, but may be sensed as gravitational force, or a component of gravitational force if the sensitive axis of the ICS is not parallel to the direction of gravitational force. Inertial force may also be sensed as acceleration, for example, as a change of velocity along a straight line, as a change of direction, or as a combination of the two. The ICS's described herein may generally have a binary state, e.g., the switch is either open or closed. An ICS may be designed to operate in various ways. In the illustrated ICS, a conductive liquid such as mercury (but which could be other liquids, such as but not limited to gallium or an electrolytic solution) may be contained within a conductive chamber. The mercury is shown in an oval shape, due to the combined effects of surface tension and gravity, but this is only an illustration and the mercury may take any feasible shape. If the mercury is at the right end of the chamber as shown ('right' with reference to the drawing), it may create an electrical connection between the electrical conductor 127 and the chamber case, which is in turn connected to the RFID tag 110 by electrical conductor 126. In this orientation the mercury would therefore complete an electrical connection between conductors 126 and 127, which could be sensed by RFID tag 110. If the mercury is at the left end of the chamber, there would be no electrical connection between electrical conductors 126 and 127, a condition that could also be sensed by the RFID tag 110. Depending on inertial forces, such as the force of gravity or a force created by acceleration, the mercury could be at either end of the chamber, and the state of an inertial force along the axis of the chamber could therefore be detected. That state may be derived from the response of the RFID tag to a poll by an RFID reader.

Some versions of an ICS may be designed to exhibit hysteresis effects (for example by placing a 'hill' between the two ends of the chamber), so that the inertial force in either direction will have to exceed a positive threshold level before the mercury will move to the opposite end and the electrical connection will change states. Depending on the orientation of the ICS and the particular design of the ICS, a variety of ICS's may be produced with differing amounts of sensitivity, threshold values, and hysteresis effects. Although the examples described involve the use of a conductive liquid to close or open a conductive path, other types of ICS may also be used with an RFID tag in the various embodiments of the invention. Such examples may include, but are not limited to, such things as: 1) a mechanical spring and post, 2) a pendulum, 3) a rolling conductive ball, 4) a sliding conductor, 5) a micro-electronic mechanical device, 6) etc. In some embodiments, the ICS may effectively be a 'latching' switch, so that once triggered, it retains its new state even if the inertial force subsequently changes to the opposite direction (such a latching effect may be achieved in any feasible manner, such as but not limited to a conductive element that would be broken by the inertial force). A latching ICS may be used to identify a previous change of state, rather than simply identify a current state, even if the change occurred when the RFID tag was not active.

Figure 2:
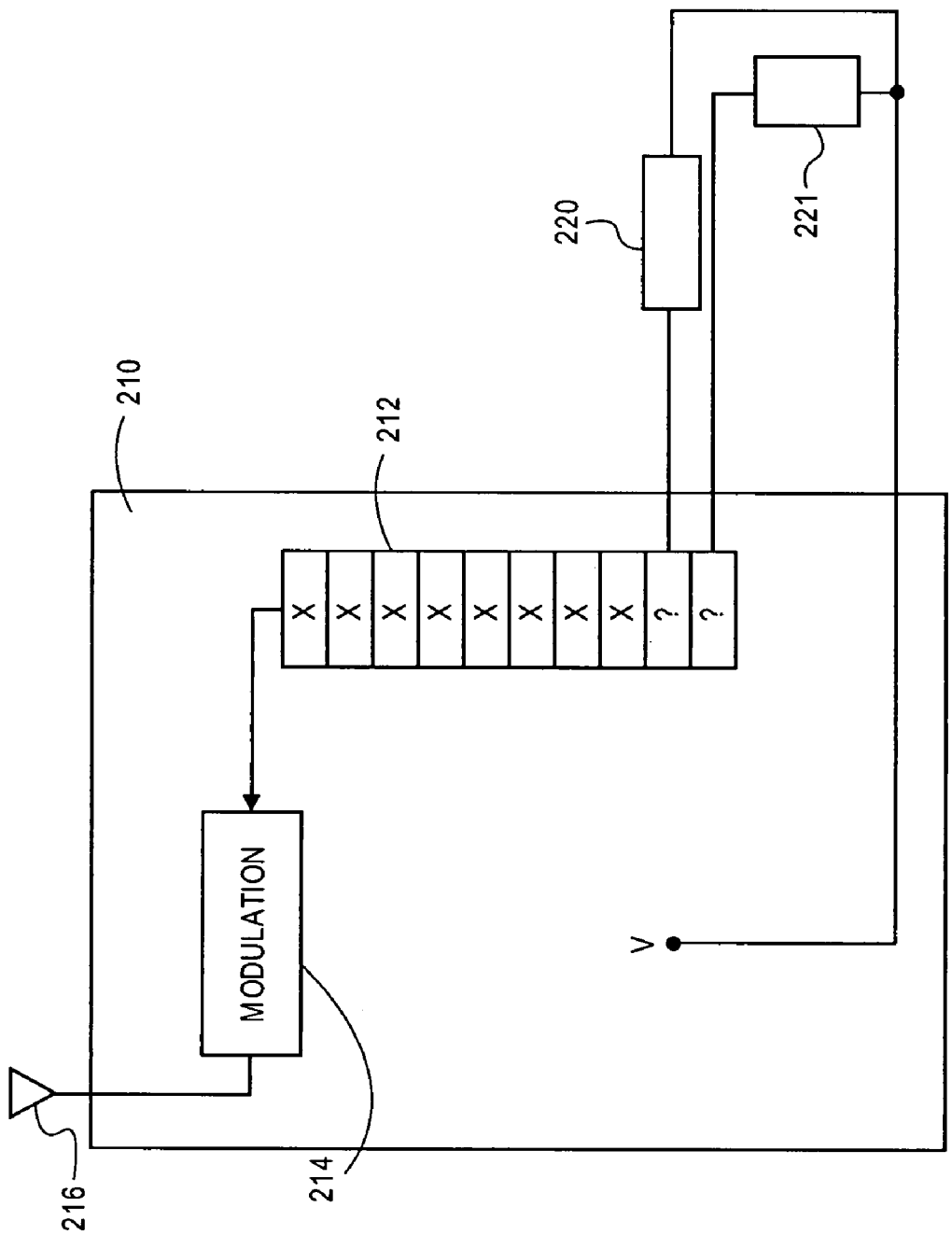
FIG. 2 shows an RFID tag coupled to at least one inertially controlled switch, according to an embodiment of the invention.

FIG. 2 shows an RFID tag coupled to at least one ICS, according to an embodiment of the invention. In the illustrated embodiment, the RFID tag may comprise an antenna 216 and an RFID tag circuit 210, which in turn may comprise a shift register 212 to contain the identification number (represented by X's) of the RFID tag, and a modulation circuit 214 to impose that identification number onto the radio frequency signal that is transmitted from antenna 216. The shift register may also contain additional bits, whose state (shown as question marks) may depend on the state of ICS 220 and ICS 221, respectively. The content of these two bits may be transmitted along with the identification number of the RFID tag. The illustrated embodiment shows two ICS switches, oriented at right angles to each other, but other embodiments may contain any feasible quantity of one or more ICS switches, oriented in any feasible directions, that are coupled to an appropriate number of bits in the shift register. With the embodiment shown, the code transmitted by RFID tag 210 may contain not only the identification number, but also one or more bits that represent the inertial state of the associated switches. The switches are shown coupled to a voltage source V, to be provided by the RFID tag, but other arrangements may also be used. In a passive RFID tag, in which the voltage V of the RFID tag is provided by the received energy from an incoming signal, the ICS switches may be powered by the same received energy, thus allowing the combination of RFID tag and ICS's to operate without battery power. Although the illustrated embodiment shows the voltage source being coupled through the ICS's to the shift register, other embodiments may use other arrangements (e.g., the shift register might be coupled to a ground connection through the ICS's, with voltage pull-ups to provide a voltage source).

Although the embodiments of FIG. 2 and subsequent figures show each individual ICS being used as an individual control or data point, other embodiments (not shown) may use multiple ICS's in various Boolean logic combinations to produce a single control or data point. Such embodiments may combine multiple ICS's in any feasible fashion, such as but not limited to: 1) combining their outputs into an OR circuit, 2) combining their outputs into an AND circuit, 3) combining their outputs into a combination of OR and AND circuits.

Figure 3:
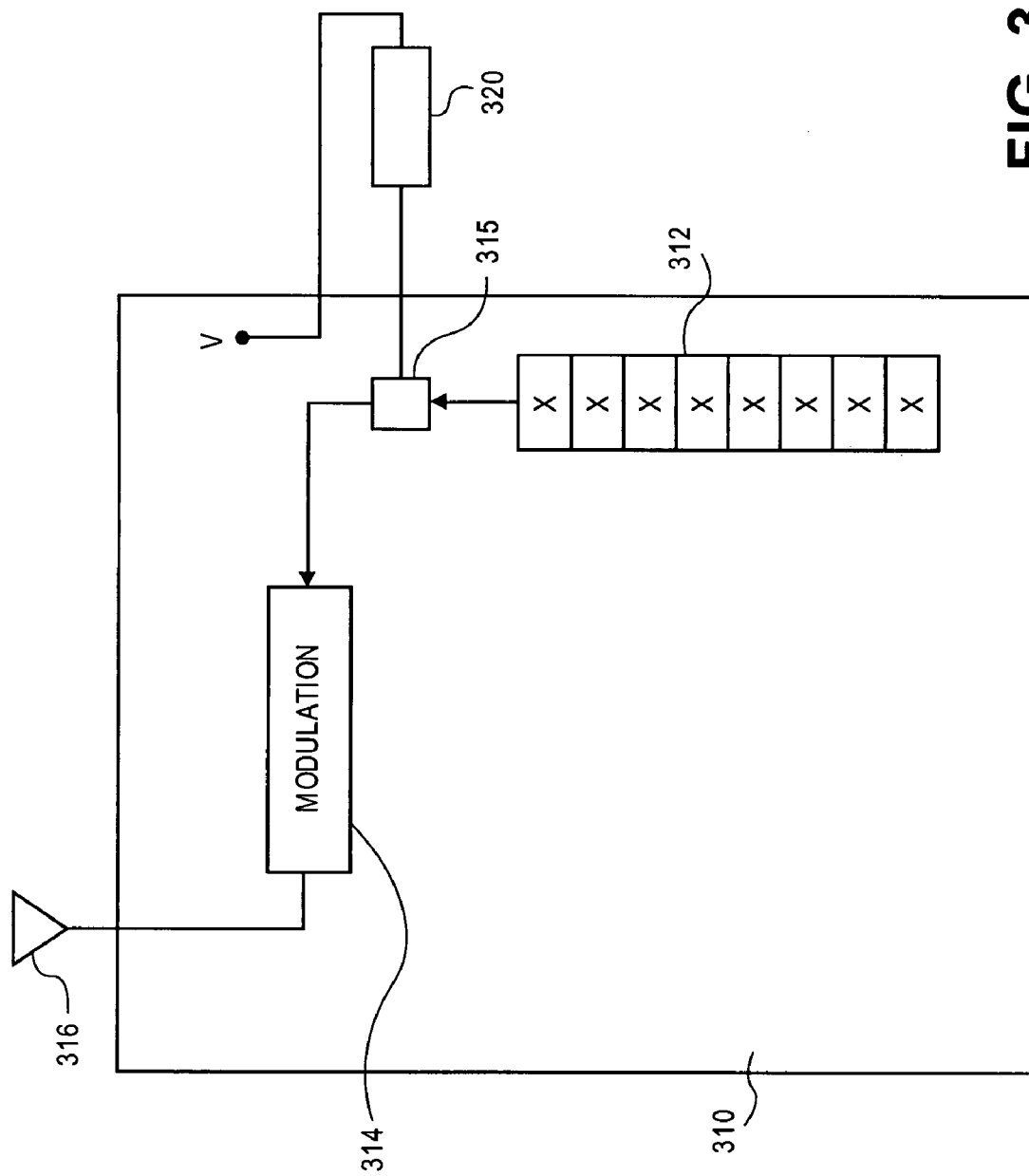
FIG. 3 shows an RFID tag coupled to an inertially controlled switch, according to another embodiment of the invention.

FIG. 3 shows an RFID tag coupled to an ICS, according to another embodiment of the invention. The illustrated embodiment of FIG. 3 may be similar in many ways to the illustrated embodiment of FIG. 2, with similar components in antenna 316, modulation circuit 314, and voltage source V. ICS 320 may be similar to ICS 220. But the embodiment of FIG. 3 may use the state of ICS 320 to control whether the contents of shift register 312 are transmitted at all by RFID tag 310. The illustrated embodiment shows the state of ICS 320 controlling a switch 315 that either passes the contents of shift register 312 on to the modulation circuit 314, or blocks those contents from being passed on the modulation circuit 314. In a similar embodiment, such a control might also be implemented by controlling the clock signal that enables the contents of shift register 312 to be shifted.

Figure 4:
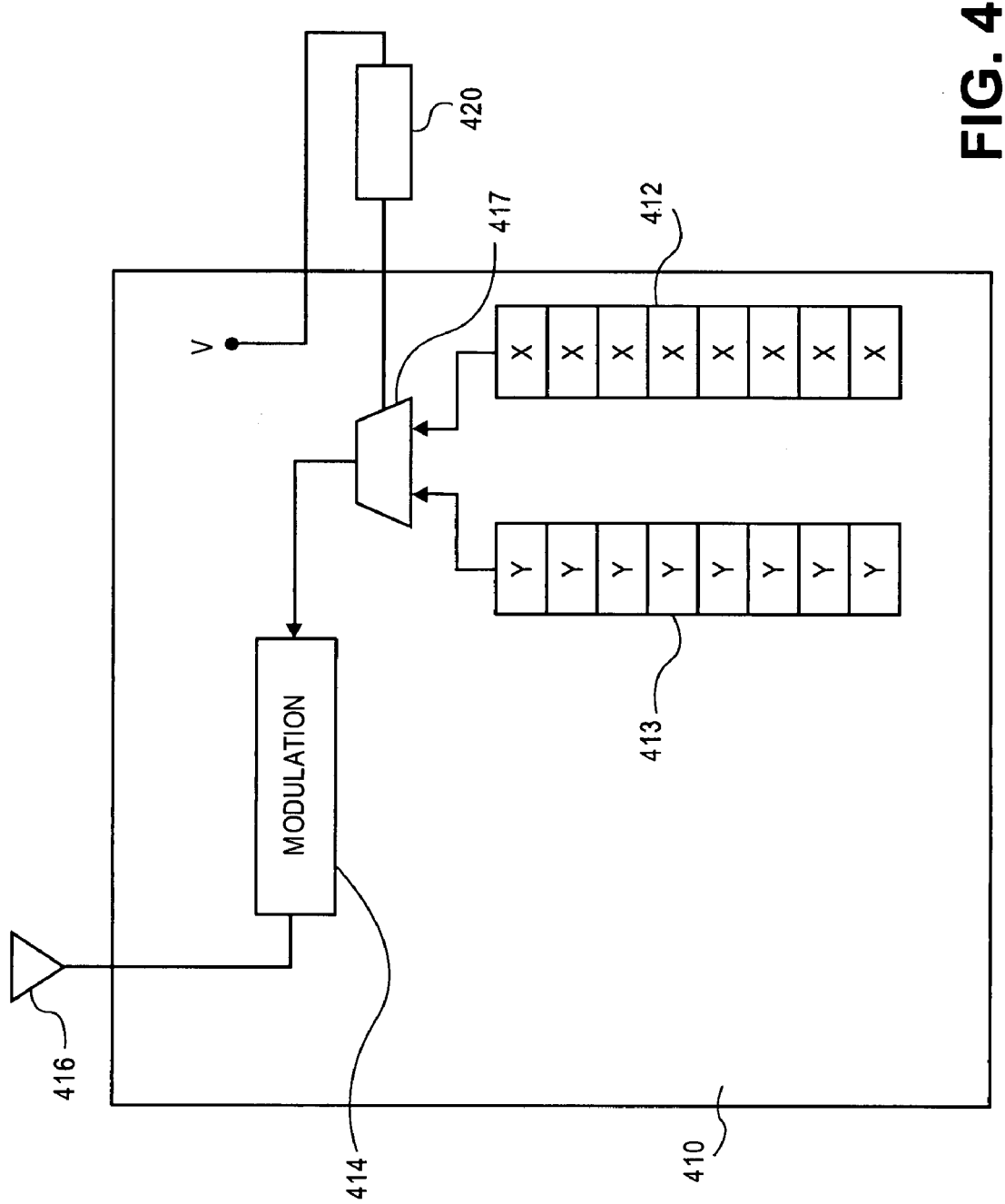
FIG. 4 shows an RFID tag coupled to an inertially controlled switch, according to still another embodiment of the invention.

FIG. 4 shows an RFID tag coupled to an ICS, according to still another embodiment of the invention. The illustrated embodiment of FIG. 4 may be similar in many ways to the illustrated embodiment of FIG. 3, with similar components in antenna 416, modulation circuit 414, and voltage source V. ICS 420 may be similar to ICS 320. But RFID tag 410 may comprise two shift registers 412, 413, each containing different identification numbers. The state of ICS 420 may be used to control a multiplexer 417, which in turn may control which of the two identification numbers is to be transmitted. Although the illustrated embodiment uses a single ICS to select between two shift registers, other embodiments may use multiple ICS's, and the RFID tag may have more than two such shift registers. As previously described, various combinations of OR circuits, AND circuits, and/or other Boolean logic circuits may be used to combine the outputs of the various ICS's to control which of multiple shift registers is selected.

Figure 5:
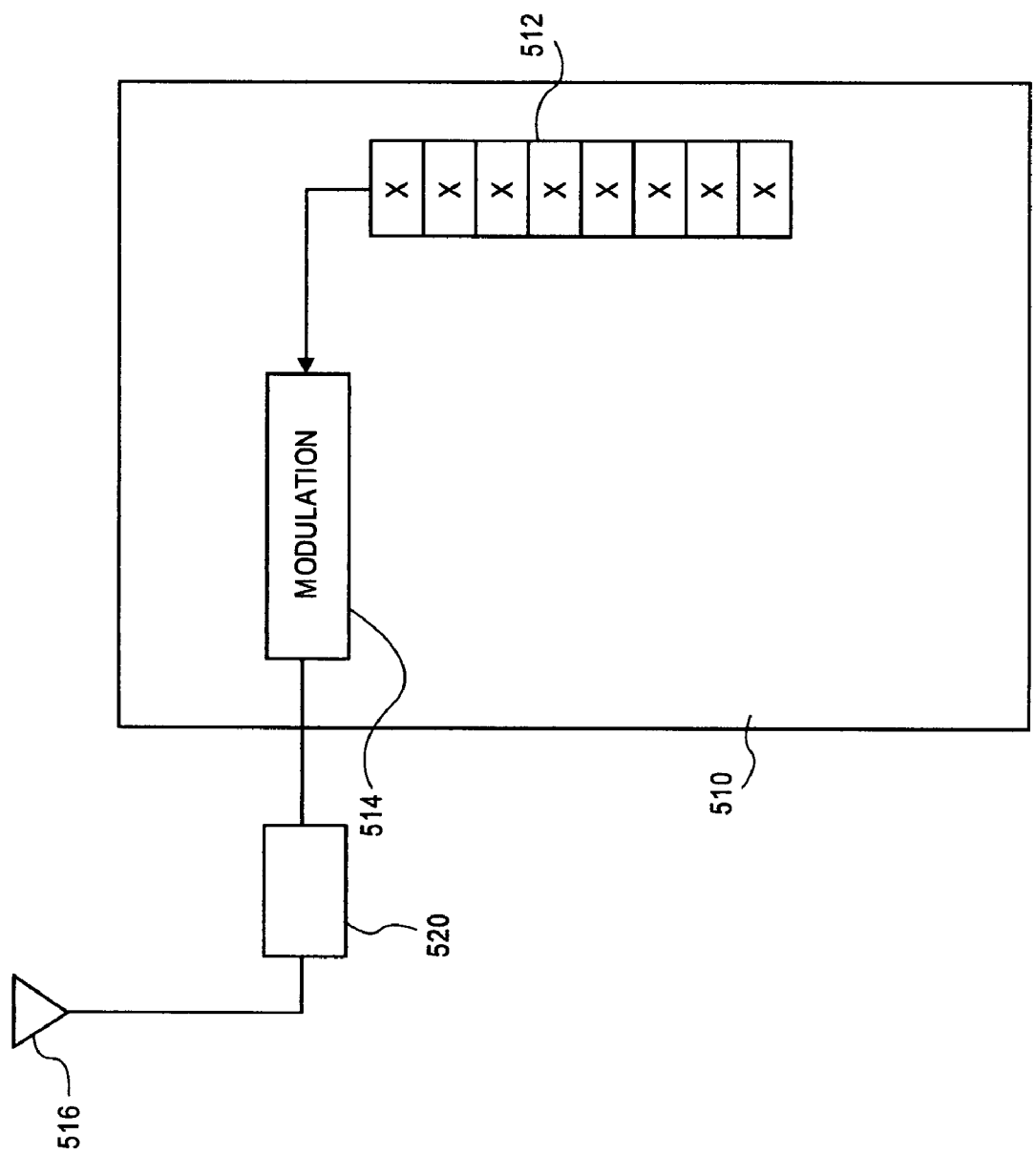
FIG. 5 shows an RFID tag coupled to an inertially controlled switch, according to still another embodiment of the invention.

FIG. 5 shows an RFID tag coupled to an ICS, according to still another embodiment of the invention. The illustrated embodiment of FIG. 5 may be similar in many ways to the illustrated embodiment of FIG. 3, with similar components in antenna 516, modulation circuit 514, and shift register 512. ICS 520 may be similar to ICS 320. However, in the embodiment of FIG. 5, the ICS may be electrically coupled between RFID tag 510 and antenna 516, so that even if the RFID tag circuit is operating, the identification number will not be transmitted if the ICS is in a state that disconnects the antenna. The embodiment of FIG. 5 may be relatively easier to implement with conventional RFID tags, in which the connection between the RFID tag circuit and the RFID antenna may be accessible without making any design changes to the RFID tag circuit.

Figure 6:
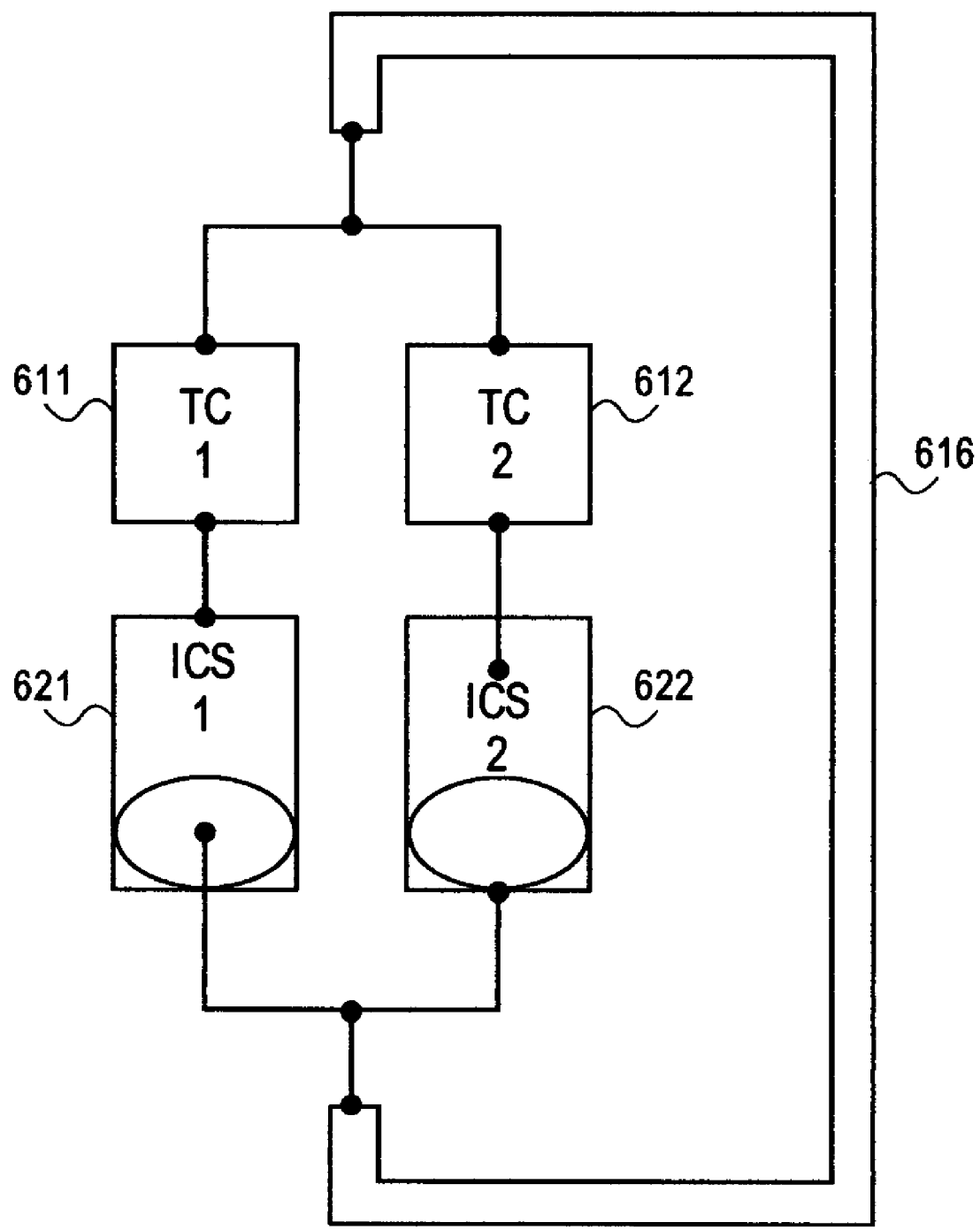
FIG. 6 shows multiple RFID tags coupled to multiple inertially controlled switches, according to an embodiment of the invention.

FIG. 6 shows multiple RFID tags coupled to multiple ICS's, according to an embodiment of the invention. The illustrated embodiment of FIG. 6 shows two RFID tag circuits 611, 612 (labeled TC 1 and TC 2, respectively), each coupled to a separate ICS 621, 622 (labeled ICS 1 and ICS 2, respectively). The two RFID tag circuits, each with its associated ICS, may share a common antenna 616. The two ICS's may be oriented such that the axes of the ICS's are substantially parallel to each other, but with each ICS sensing inertial force in an opposite direction from the other. Thus, in any given situation, one ICS may have closed contacts while the other ICS may have open contacts. In this condition, when the RFID tag circuits are energized, only one RFID tag circuit will be operationally coupled to the antenna 616 at a time, and therefore able to transmit its identification number through the antenna 616, so the receiving RFID reader will be able to determine the orientation or acceleration of the object holding these devices (at least along one axis-multiple such dual combinations may be used to sense orientation or acceleration along multiple axes). Although the illustrated embodiment shows each ICS being used to connect or disconnect the antenna directly to the appropriate RFID tag circuit (using a technique such as that described for FIG. 5), any other feasible techniques (such as but not limited to the technique described in FIG. 3) may be used with the dual ICS/opposite-inertia configuration of FIG. 6 to assure that one and only one RFID tag circuit responds to the RFID reader.

Although the RFID antennas have been shown using various symbologies in the drawings, the specific symbologies used are only for ease of illustration and should not be interpreted to limit the type of antennas that may be used in various embodiments of the invention.

Figure 7:
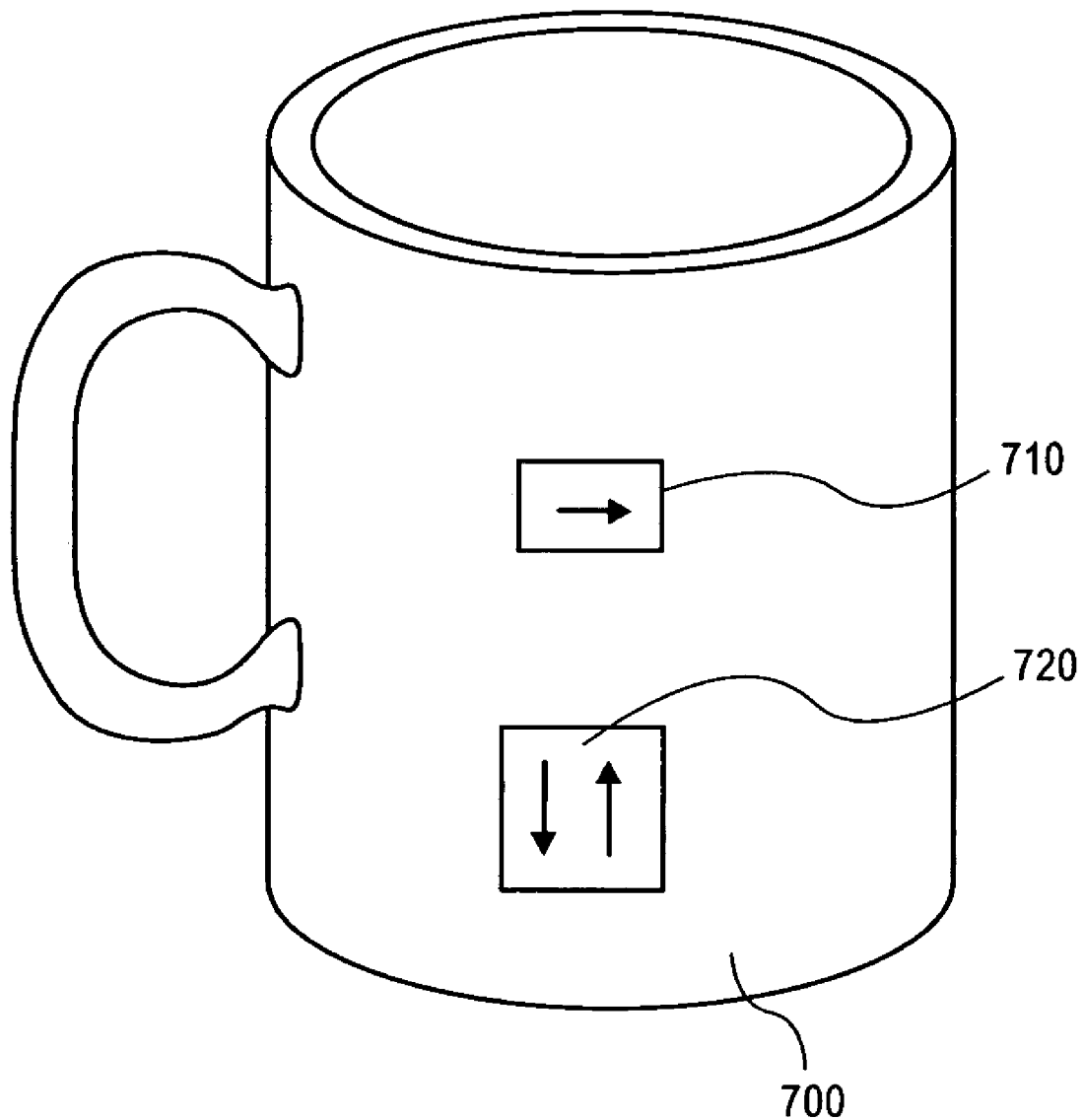
FIG. 7 shows RFID tags and inertially controlled switches attached to an object, according to an embodiment of the invention.

FIG. 7 shows RFID tags and ICS's attached to an object, according to an embodiment of the invention. In the embodiment shown, an object 700 (shown as a drinking cup for illustrative purposes, but it could be any suitable object) has two types of ICS/RFID tag combinations attached to it. In this example, item 710 may represent a single RFID tag with a single ICS which is mounted to sense acceleration along an axis that is slightly off horizontal. The ICS and RFID tag could be coupled to each other in any feasible electrical configuration, such as but not limited to the examples of FIGS. 2, 3, 4, or 5. For example, the ICS might be electrically open when the cup is motionless in the normal position shown, but would be momentarily closed if the cup were moved to the right or left because the force of acceleration (if initially moved to the left) or deceleration (if stopped after being moved to the right) would be more than enough to offset the slight component of gravity that operates on the ICS when the cup is motionless in the normal position. If this configuration were repeatedly polled by an RFID reader, the signals received by the reader could be used to determine if the cup were being moved. In a similar configuration, multiple ICS's may be used to sense motion or orientation along multiple axes. For example, three ICS's, each at approximately right angles to the other two, could be used to sense orientation in three dimensional space.

Item 720 may represent a dual ICS/RFID tag combination, such as that shown in FIG. 6, in which one, but not both, RFID tags would respond to a poll by an RFID reader. In the upright position shown in FIG. 7, one RFID tag would respond to a poll by an RFID reader, while the other RFID tag would respond if the cup were upside down. Although a drinking cup has been used to illustrate the above points, these principles may be used singly or in combination with a variety of objects to detect orientation and/or acceleration.

Figure 8:
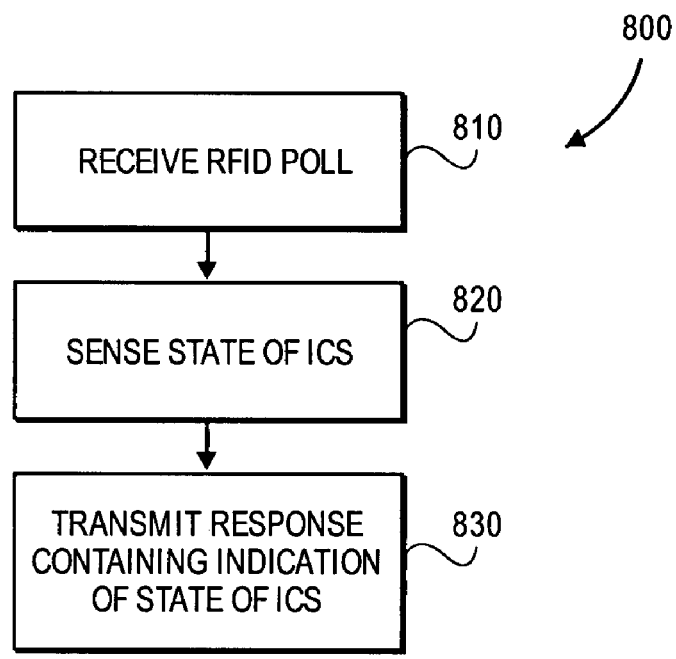
FIGS. 8 and 9 show flow diagrams of methods to be performed by an RFID tag, according to an embodiment of the invention.
Figure 9:
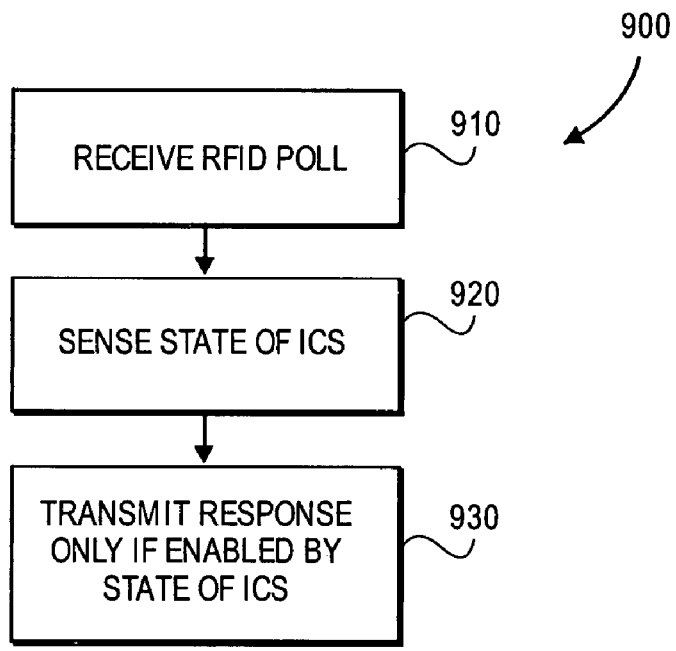

FIGS. 8 and 9 show flow diagrams of methods to be performed by an RFID tag, according to an embodiment of the invention. Flow diagram 800 assumes an RFID tag may transmit a response regardless of the state of the one or more ICS's connected to it, as may be the case with the configurations of FIGS. 2 or 4. At 810 the RFID tag receives an RFID poll from an RFID reader. When the RFID tag is sufficiently energized, it may sense the state of one or more ICS's that are connected to it. 'Sensing' may comprise letting the state affect one or more bits in the RID tag, or letting the state select one of two or more identification numbers. At 830 the RFID tag may transmit a response to the RFID poll, with the contents of that response indicating the state(s) sensed for the one or more ICS's.

Flow diagram 900 assumes an RFID tag may transmit a response to indicate that the one or more ICS's are in a particular state or combination of states, while the RFID tag does not transmit a response if the one or more ICS's are not in that particular state or combination of states, as would be the case with the configurations of FIGS. 3 or 5. In a similar manner to that previously described in FIG. 8, the RFID tag may receive a poll at 910 and sense the state of one or more ICS's at 920. However, the response may be transmitted at 930 only if the one or more ICS's are in a particular state or combination of states.

The method performed by the configuration of FIG. 6 might be considered a hybrid combination of the methods of FIGS. 8 and 9. Each individual RFID tag may respond to a poll or not respond to the poll based on the state of it's associated ICS, similar to the method of FIG. 9. But the pair of opposing RFID tags, as a coordinated unit, may respond to a poll by transmitting one of two responses, similar to the method of FIG. 8.

Figure 10:
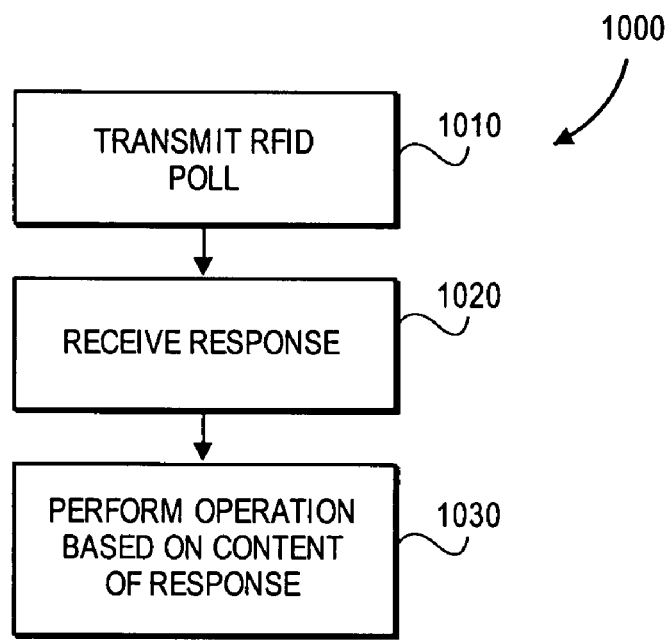
FIGS. 10 and 11 show flow diagrams of methods to be performed by an RFID reader and/or at least one associated system, according to an embodiment of the invention.
Figure 11:
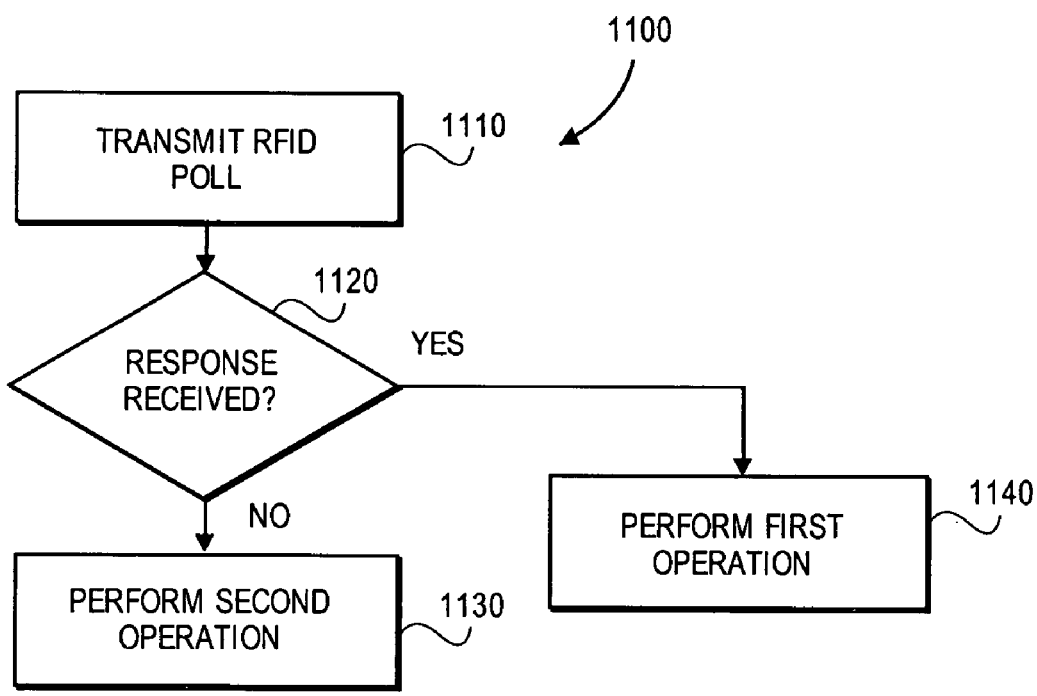

FIGS. 10 and 11 show flow diagrams of methods to be performed by an RFID reader and/or at least one associated system, according to an embodiment of the invention. Flow diagram 1000 assumes the polled RFID tag may transmit a response regardless of the state of the one or more ICS's connected to it, as may be the case with the RFID tag configurations of FIGS. 2 or 4. At 1010 the RFID reader transmits an RFID poll, and at 1020 the RFID reader receives a response from an RFID tag. The reader and/or at least one associated system may examine the contents of the received response, and may perform an operation based on the contents of that response. The method of FIG. 10 may also be applicable when the RFID tag configuration of FIG. 6 is being used, since a response may be expected regardless of the states of the relevant ICS's.

Flow diagram 1100 assumes an RFID tag may transmit a response to indicate that the one or more ICS's are in a particular state or combination of states, while the RFID tag does not transmit a response if the one or more ICS's are not in that particular state or combination of states, as may be the case with the configurations of FIGS. 3 or 5. In a similar manner to that previously described in FIG. 10 the RFID reader may transmit a poll at 1110. At 1120, if a response to the poll is received from a particular RFID tag within a designated time (since any response may be expected to occur within a designated time, there should be a limit on how long to wait for the response), the RFID reader and/or an associated system may perform a first operation at 1140. However, if no response is received within the designated time, the RFID reader and/or associated system may perform a second operation at 1130. The exact nature of the operations performed by the RFID reader and/or associated systems may be highly dependent on the particular application of the system, and are not discussed here to avoid obscuring an understanding of the various embodiments of the invention.

Multi-Bit Accelerometers

Figure 12:
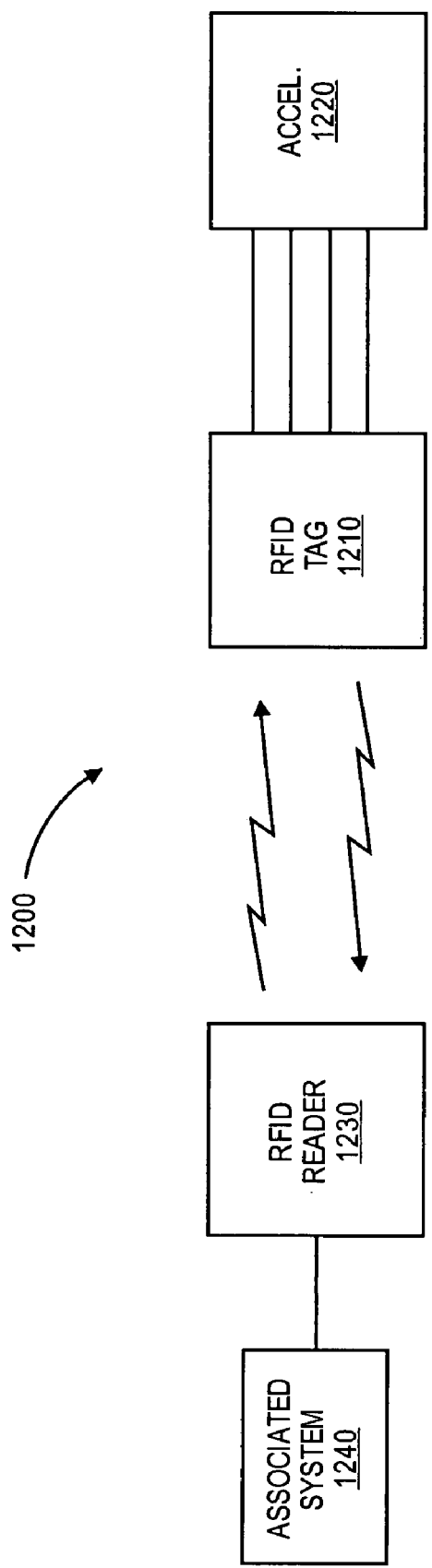
FIG. 12 shows an RFID system using an accelerometer, according to an embodiment of the invention.

Some embodiments of the invention may use one or more multi-bit accelerometers with RFID tag(s), instead of using the ICS(s) described previously. FIG. 12 shows an RFID system 1200 using an accelerometer connected to an RFID tag, according to an embodiment of the invention. Accelerometers can convert sensed acceleration into an analog or digital value that represents the magnitude, and in some embodiments the sign (which of two opposite directions along the axis of measurement), of the sensed acceleration. In FIG. 12, an accelerometer 1220 is shown that provides a digital value to the RFID tag 1210 through connecting signal lines. For ease of illustration, only four connecting lines are shown, but other embodiments may use any feasible number of connecting lines. In some embodiments, another signal line may provide a polarity signal (e.g., a '1' on the line may indicate acceleration in one direction, while a '0' on the line may indicate acceleration in the opposite direction). In addition to the required number of signal lines, power lines may also be used to provide operating power to the accelerometer from the RFID tag. In embodiments that use passive RFID tags, this operating power may only be provided when the RFID tag is receiving a wireless signal sufficiently strong to power the RFID tag and the accelerometer.

FIG. 12 also shows RFID reader 1230 to provide the wireless signal to power the RFID tag and accelerometer, and to read the wireless response containing an identifying code and the accelerometer value. An associated system 1240 may be communicatively connected to the RFID reader to perform, among other things, useful tasks with the acceleration information provided by the RFID tag.

Figure 13:
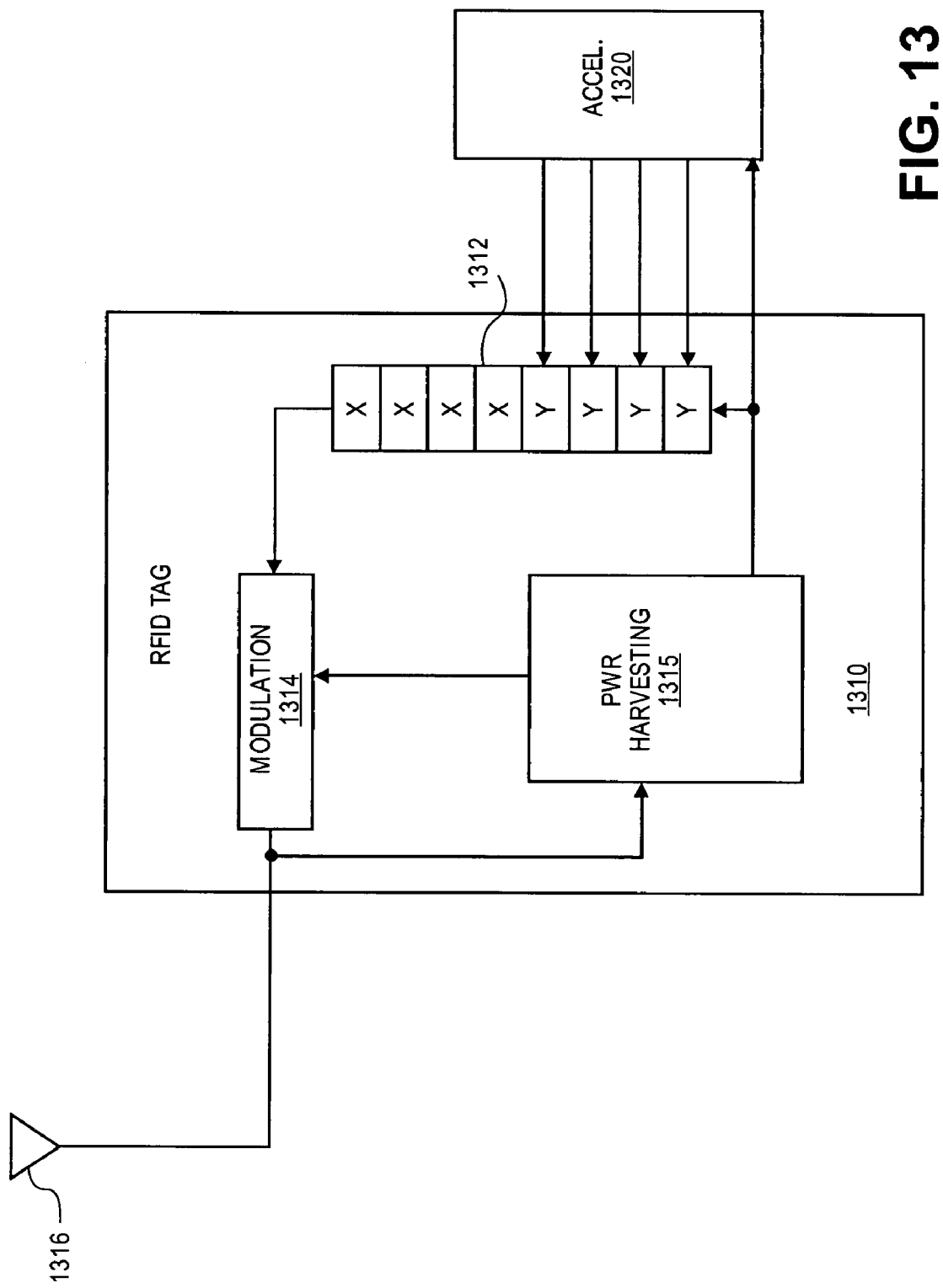
FIG. 13 shows an RFID tag with an accelerometer, according to an embodiment of the system.

FIG. 13 shows an RFID tag with an accelerometer, according to an embodiment of the system. In the illustrated embodiment of FIG. 13, RFID tag 1310 may include a power harvesting circuit 1315 to collect radio frequency energy received through antenna 1316 and provide that energy to operate the various circuits of RFID tag 1310 and to operate accelerometer 1320. Shift register 1312 may contain an identification code for the RFID tag 1310 (represented by the 'X' bits), and may also contain other bits that latch the binary value being provided by accelerometer 1320 (represented by the 'Y' bits). When triggered by a proper signal received through the antenna 1316, the bits of this shift register 1312 may be serially shifted through modulation circuit 1314, and thus converted into the proper form for transmission through antenna 1316. For simplicity of illustration, the embodiment shown contains only 4 identification bits and 4 bits for accelerometer value, but other embodiments may use any feasible number of bits for both the identification code and the accelerometer value. Although the illustrated embodiment only shows a single accelerometer, other embodiments may use multiple accelerometers, with each one providing a multi-bit value to the shift register. For example, three 8-bit accelerometers might provide their inputs to a 24-bit portion of the shift register. Within the context of this document, each axis of measurement is referred to as a separate accelerometer, even if multiple axes of measurement are provided by a single integrated device. For example, a 3-axis accelerometer that provides acceleration values along three orthogonal axes would be referred to herein as three accelerometers, even if it might be referred to in other documents as one multi-axis accelerometer.

Figure 14:
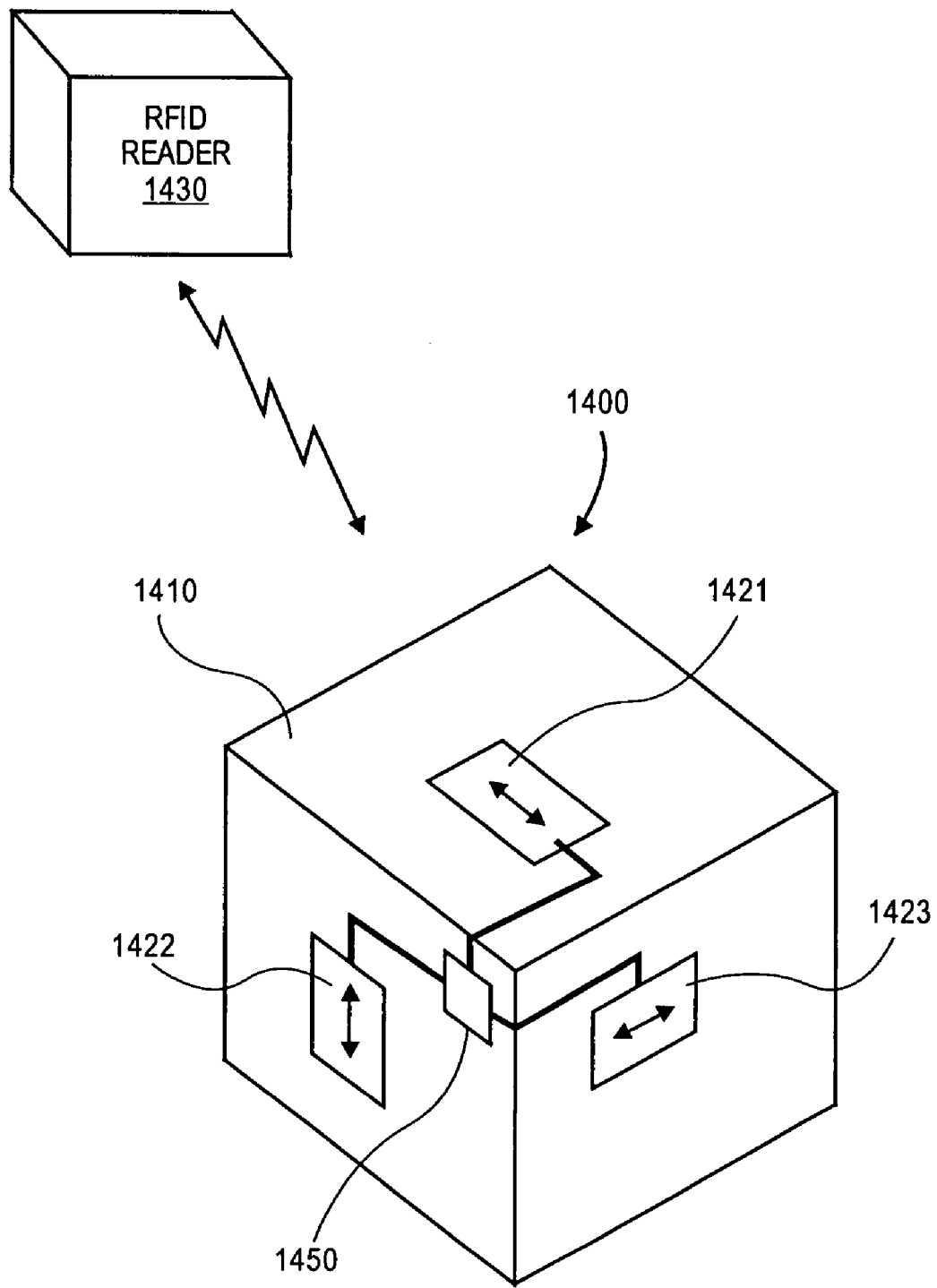
FIG. 14 shows an RFID system using multiple accelerometers, according to an embodiment of the invention.

FIG. 14 shows an RFID tag with 3 accelerometers mounted on an object, according to an embodiment of the invention. By mounting the accelerometers 1421, 1422, and 1423 in mutually perpendicular orientations on object 1410, RFID tag 1450 may send information to RFID reader 1430 about acceleration sensed in 3-dimensional space. Note: within the context of this document, the orientation of an accelerometer refers to the orientation of the axis along which the accelerometer measures acceleration. Since gravity may have the same effect on accelerometers as actual acceleration, in some embodiments the three mutually-perpendicular accelerometers may provide information about the orientation of object 1410 with respect to gravity. This orientation knowledge may be used in many different ways. For example, a wireless sensor device might provide information about its changing orientation with respect to vertical. Through interactions with a computer, this information could in turn be used to control the orientation of a completely different object (a physical object, a visual image on a display, etc.) to follow the orientation of the sensor.

Figure 15:
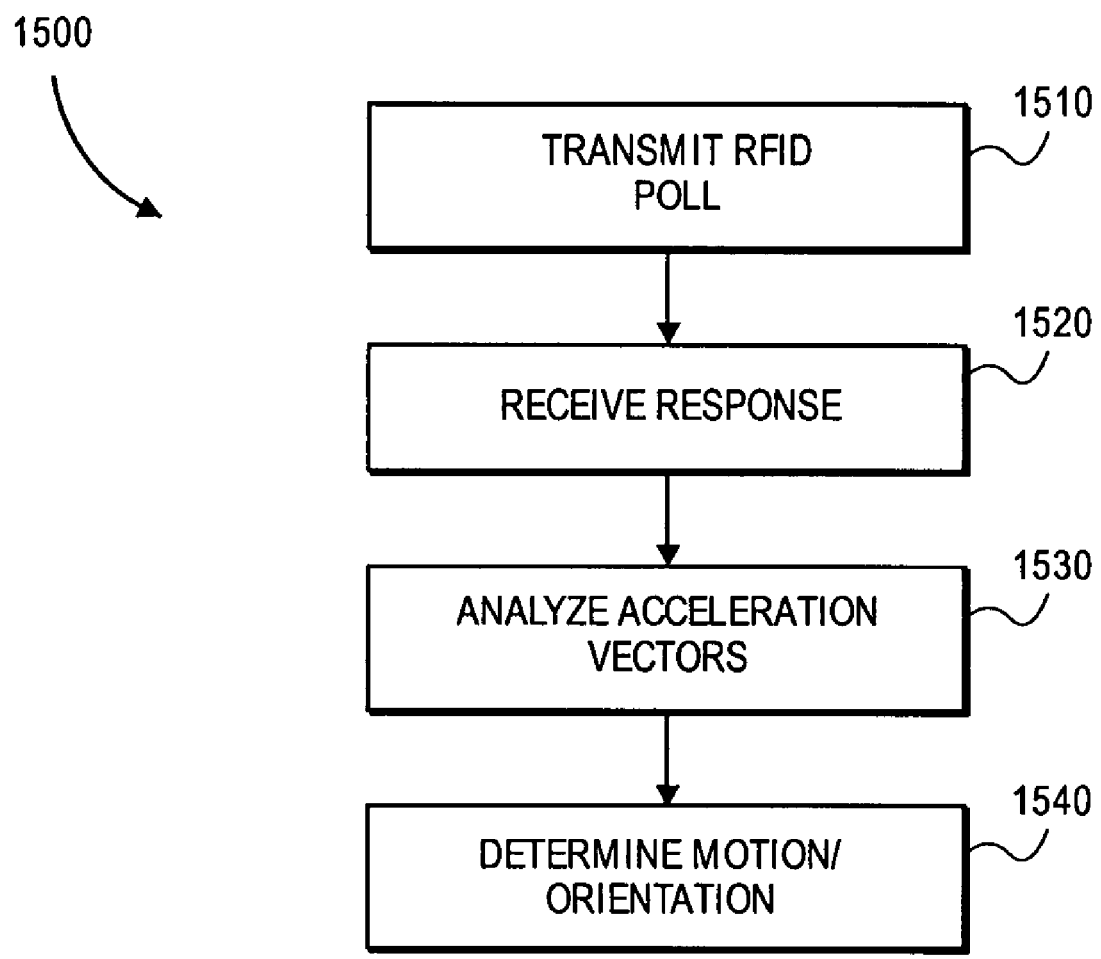
FIG. 15 shows a flow diagram of a method performed by an RFID reader, according to an embodiment of the invention.

FIG. 15 shows a flow diagram of a method performed by an RFID reader, according to an embodiment of the invention. In the flow diagram 1500, at 1510 the RFID reader may transmit a poll to an RFID tag. At 1520 a response may be received from the RFID tag, the response containing acceleration information from one or more accelerometers associated with the responding RFID tag. This acceleration information might be referred to as acceleration vectors, for example if it is from mutually perpendicular accelerometers. The information from the accelerometer(s) may be used to perform various computational tasks at 1540, such as determining orientation and/or motion of an object to which the accelerometer(s) are mounted.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
a first and second radio frequency identification (RFID) tag to transmit a response to a signal from an RFID reader;
a first accelerometer coupled to said first RFIFD tag and a second accelerometer coupled to said second RFID tag, said first and second accelerometers positioned with respect to one another to measure acceleration in different directions, only one of said accelerometers operative at any instance in time;
each of said RFID tags to provide an identifier and an acceleration value in response to a signal from an RFID reader so that the RFID reader can distinguish between the acceleration values from the first and second accelerometers based on the identifier of the first or second RFID tag; and
a single antenna for both of said tags.

2. The apparatus of claim 1, wherein operating power for the first accelerometer is to be provided by the first RFID tag.

3. The apparatus of claim 2, wherein the operating power for the first accelerometer is to be provided from energy harvested by the first RFID tag from a radio frequency signal received through an antenna of the first RFID tag.

4. The apparatus of claim 1, further comprising:
an object coupled to the first accelerometer;
the second accelerometer coupled to the object in an orientation perpendicular to the first accelerometer;
wherein first and second accelerometers are both to provide their sensed acceleration values to an RFID tag for transmission from an RFID tag.

5. The apparatus of claim 4, further comprising:
a third accelerometer coupled to the object in an orientation perpendicular to the first and second accelerometers;
wherein the third accelerometer is to provide its sensed acceleration value to an RFID tag for transmission from the RFID tag.

6. The apparatus of claim 1, further comprising at least one signal line coupled between the first accelerometer and the first REID tag to indicate a direction of the indicated amount of acceleration.

\* \* \* \* \*

UNITED STATES PATENT AND TRADEMARK OFFICE
CERTIFICATE OF CORRECTION

| | | |
|---|---|---|
| PATENT NO. | : 7,956,725 B2 | Page 1 of 1 |
| APPLICATION NO. | : 11/715038 | |
| DATED | : June 7, 2011 | |
| INVENTOR(S) | : Joshua R. Smith | |

It is certified that error appears in the above-identified patent and that said Letters Patent is hereby corrected as shown below:

Column 9:
Line 16, "first RFIFD tag" should be --first RFID tag--;

Column 10:
Line 22, "first REID tag" should be --first RFID tag--.

Signed and Sealed this
Ninth Day of August, 2011

David J. Kappos
*Director of the United States Patent and Trademark Office*